(12) United States Patent
Raynor

(10) Patent No.: US 7,586,168 B2
(45) Date of Patent: Sep. 8, 2009

(54) HIGH PERFORMANCE PHOTOSENSOR

(75) Inventor: Jeffrey Raynor, Edinburgh (GB)

(73) Assignee: STMicroelectronics (Research & Development) Limited, Marlow-Buckinghamshire (GB)

(*) Notice: Subject to any disclaimer, the term of this patent is extended or adjusted under 35 U.S.C. 154(b) by 194 days.

(21) Appl. No.: 11/750,024

(22) Filed: May 17, 2007

(65) Prior Publication Data

US 2007/0267710 A1 Nov. 22, 2007

(30) Foreign Application Priority Data

May 17, 2006 (EP) .................................. 06252575

(51) Int. Cl.
*H01L 27/14* (2006.01)
(52) U.S. Cl. ...................... 257/431; 257/532
(58) Field of Classification Search ................. 257/215, 257/250, E33.076, 431, 532
See application file for complete search history.

(56) References Cited

U.S. PATENT DOCUMENTS

2005/0072978 A1* 4/2005 Raynor ......................... 257/75
2005/0206548 A1* 9/2005 Muramatsu et al. ......... 341/172
2007/0007434 A1* 1/2007 Pain ........................ 250/208.1

FOREIGN PATENT DOCUMENTS

EP          1052846          11/2000

OTHER PUBLICATIONS

Kawahito, S., Yoshida, M., Sasaki, M., Umehara, K., Tadokoro, Y., Murata, K., Doushou, S., Matsuzawa, A. "A Compressed Digital Output CMOS Image Sensor with Analog 2-D DCT Processors and ADC/Quantizer." IEEE International Solid-State Circuits Conference: Session 11. 1997.*

* cited by examiner

*Primary Examiner*—Mark Prenty
(74) *Attorney, Agent, or Firm*—Lisa K. Jorgenson; Allen, Dyer, Doppelt, Milbrath & Gilchrist, P.A.

(57) ABSTRACT

A photosensor includes a photovoltage generator for generating a photovoltage, and a comparator for determining a number of integer multiples of a threshold voltage associated with the photosensor. A primary counter is incremented by the determined number of integer multiples. A voltage injector adds at least one unit of voltage to the comparator, with each voltage unit having a value less than the threshold voltage. A secondary counter determines a number of voltage units needed to cause the voltage in the comparator to attain an integer multiple of the threshold voltage.

13 Claims, 8 Drawing Sheets

HIGH PERFORMANCE PHOTOSENSOR

FIELD OF THE INVENTION

The present invention relates to photosensors, and more particularly, to a high performance photosensor for use in medical imaging devices, for example.

BACKGROUND OF THE INVENTION

Before describing the present invention, it is useful to review some of the factors that determine the performance of a photosensor and prior art attempts to improve the performance of photosensors by reducing the effects of noise therein. A photosensor and its accompanying electronics will be referred to as a pixel.

The full well capacity of a photosensor refers to the total amount of charge that can be stored in the photosensor before overflowing into adjoining photosensors. Since this feature is a result of the photocharge being stored on a capacitor, which is in turn dependent on pixel area, the full well capacity of a photosensor is dependent on its physical size.

Dynamic range is defined as the maximum signal strength achievable by a photosensor divided by the noise in the photosensor. The maximum achievable signal strength by a photosensor is determined by the full well capacity of the photosensor. Furthermore, the noise in the photosensor is the sum of dark and read noise components. In other words, the dynamic range of a photosensor can be described by equation (1) below.

$$\text{Dynamic Range} = \frac{\text{Full well capacity}}{\text{Dark Noise} + \text{Read Noise}} \quad (1)$$

Looking at equation (1) it can be seen that one way of increasing the dynamic range of a photosensor is by increasing its full well capacity.

Responsivity is a measure of the effectiveness of a photosensor in converting incident electromagnetic radiation into electrical current or voltage, and is inversely related to the capacitance of the photosensor.

There are three main sources of noise that contribute to the degradation of the quality of an image: photon shot noise, dark noise and read noise.

Photon shot noise results from natural fluctuations in the number of photons detected by a photosensor and is caused by the quantum statistical nature of photon emission and detection. This randomness is manifested as a temporal and spatial fluctuation in the signal produced by the photosensor. Photon shot noise occurs even with an ideal noise-free light source and an ideal noise-free photosensor. Thus, photon shot noise imposes a fundamental limit on the responsivity of a photosensor insofar as it determines the minimum noise level achievable therein.

Photon shot noise is governed by Poisson statistics and is described by the square root of the number of photons hitting a photosensor per unit time (or in other words, the square root of the intensity or flux (F) of incident radiation). Therefore, increasing flux density (F) reduces the relative fraction of photon shot noise.

However, as will be recalled, the full well capacity of a photosensor provides an upper limit on the number of photons that can be integrated therein. Thus, any attempt to increase the flux density of the radiation incident on a photosensor and the detection thereof must be accompanied by an increase in the full well capacity of the photosensor.

Read noise is a combination of system noise components inherent in the conversion of photogenerated charge carriers into a measurable signal; processing of the resulting signal; and analog-to-digital (A/D) conversion thereof.

Thus, read noise determines the lower detection limit of a pixel. Unfortunately, one of the major components of read noise is pixel reset noise, which depends on the capacitance of the pixel and is given by $$Vnoise = \sqrt{k * \frac{t}{c}},$$

where k represents Boltzmann's constant ($1.38\ \text{E-}23\ \text{m}^2\text{kgs}^{-2}\text{K}^{-1}$), T represents the operating temperature in degrees Kelvin and C represents the capacitance of the pixel. Accordingly, any attempt to reduce the read noise of a pixel (by reducing its full well capacity) conflicts with increasing the dynamic range and reducing photon shot noise.

Prior art photosensors will now be discussed. Photons impinging on a semiconductor are absorbed by its atoms and if they are of sufficient energy, the photons liberate electron(s) from the atoms. Should an electron be liberated in the presence of an electric field, the electron will be drawn away from its atom and will not recombine therewith. In a photosensor, this process is typically achieved using a reverse-biased P-N junction which forms a diode.

There are several ways of detecting the photogenerated charges in a photodiode. Referring to FIG. 1, the simplest method is to measure a voltage on a photodiode 2. The photodiode 2 is reset to a known voltage (Vrt2) before being exposed to photons. When exposed to photons, the charges produced in the photodiode 2 discharge the photodiode 2. After its exposure to photons, the voltage across the photodiode 2 is measured. This voltage will be referred to as the post-exposure voltage. Furthermore, the difference between the reset voltage (Vrt2) and the post-exposure voltage will be referred to as the voltage swing.

The voltage swing of a photodiode is proportional to the number of photoelectrons generated therein. The relationship between the voltage swing of a photodiode and the number of photoelectrons generated therein can be described by equation (2) below $$\Delta V = \frac{Q}{C_{pd}} \quad (2)$$

where $\Delta V$ is the voltage swing, Q is the photogenerated charge in the photodiode and Cpd is the photodiode's intrinsic capacitance. This relationship will be referred to as the conversion gain of a photodiode.

The above technique works well for small pixels (e.g., <10 um) as the photodiode capacitance (Cpd) is small and hence the conversion gain of the photodiode is large. However, increasing pixel size does not increase voltage swing, since while more photons impinge on a larger photodiode, the voltage change produced by the resulting photocharge is negated by the increased photodiode capacitance. Consequently, there is in effect a reduced conversion gain from the larger pixel.

One approach to the problem of reducing read noise while increasing full well capacity is to employ a digital pixel as described in "Performance of a 4096 pixel photon counting chip", Proc. SPIE Symposium on Optical Science, Engineering and Instrumentation, 19-24 Jul. 1998, San Diego, SPIE Proceedings, pp. 3445-31. This system effectively increases full-well capacity by adding bits in a counter and uses a charge amplifier to convert photogenerated charge into a voltage swing.

More particularly, referring to FIG. 2 the Medipix™ sensor 10 comprises a photodiode 12 connected to a charge integrator 14 that in turn comprises a feedback capacitor ($C_{fb}$) and a charge amplifier 15. The charge amplifier 15 includes two inputs: an inverting input $V_{inn}$ and a reset input $V_0$. The charge integrator 14 is connected to a monostable oscillator 16 and a comparator 18. The comparator 18 is in turn connected to a counter 20.

Referring to FIG. 3, the imaging process performed by the Medipix™ sensor comprises two phases: an illumination phase ($P_0$) and a readout phase ($P_1$). During the illumination phase ($P_0$), the sensor is illuminated by incident radiation and photocharges are generated thereby in the photodiode. During the readout phase ($P_1$), the sensor is no longer illuminated and the signals generated in the sensor are readout therefrom.

Referring to FIG. 2 in combination with FIG. 3, at the start of an illumination phase ($P_0$) and before radiation has been emitted from a radiation source (not shown), a Start Frame (SF) signal is transmitted which resets the counter 20 and the charge integrator 14 (to reset voltage $V_0$).

When radiation is emitted from the radiation source (not shown) and the Medipix™ sensor 10 is illuminated thereby, the charge integrator 14 detects the photogenerated charge produced in the photodiode 12 and the feedback capacitor $C_{fb}$ produces a ramp signal $V_{out}$. The slope of which is proportional to the photocurrent, and inversely proportional to the feedback capacitance as shown in equation (3) below.

$$\frac{dV_{out}}{dt} = \frac{I_{photo}}{C_{fb}} \quad (3)$$

When the output from the charge integrator 14 reaches a threshold $V_{ref}$ (set externally to the sensor 10), the output (a COMP signal) from the comparator 18 is switched to a high state.

The COMP signal has two functions. In particular, the COMP signal is used to reset the charge integrator 14 (to reset voltage $V_0$); and increment the counter 20.

Thus, each increment of the counter 20 corresponds to a photogenerated voltage of $$(V_{ref} - V_0) \times \frac{C_{fb}}{e}$$

(where $e=1.6\times10^{-19}$ C). In other words, if the output from the counter 20 equals 42, a voltage ($V_{pd}$) of $$42 \times (V_{ref} - V_0) \times \frac{C_{fb}}{e}$$

has been produced by the photodiode 12.

A monostable oscillator 16 is used to ensure that a reset pulse (not shown) is long enough to completely discharge the integrator 14. Optionally, a switch (not shown) may be provided between the photodiode 12 and the charge integrator 14. This switch is opened during the reset of the charge integrator 14 and prevents any disturbance to the charge on the photodiode 12 during the resetting operation.

There are various methods of accessing the data in the counter 20. The simplest method is shown in FIG. 2, namely parallel output. For example, let there be a ten bit parallel bus 22 to which all the pixels in a given column are connected. When the sensor 10 wishes to access a row, it asserts a Pixel Read (PR) signal (which is common to all of the pixels in a row) which causes the counter 20 on this row to output its data. The Pixel Read (PR) signal also causes all of the counters on the other rows to switch into a high-impedance/tri-state mode.

An alternative data access method is a bit serial approach, as shown in FIG. 4. In this method, there is a single output from each pixel $Pix_i$ (and there is no access signal) wherein the data is daisy-chained (i.e., the output from one pixel $Pix_i$ is passed to the input of the next pixel $Pix_{i+1}$). The advantage of this technique is that the number of conductors required in the Medipix™ sensor 10 is greatly reduced. Consequently, a greater proportion of any incident radiation can reach the photosensitive area of a pixel and the sensitivity of the pixel is improved.

A hybrid of the two data access methods is also possible (e.g., 5 bit parallel daisy-chain). This reduces the number of connectors required in the Medipix™ sensor and also halves the pixel rate.

Problems with the prior art will now be discussed. Referring to FIG. 2 of the Medipix™ sensor 10 a practical capacitance for the feedback capacitor $C_{fb}$ is 5 fF. Furthermore, a voltage swing of less than 300 mV is impractical. Since charge equals voltage multiplied by capacitance, using the above values, 1.5 fC (which corresponds to 10,000 electrons) are required to increment the counter 20 by one count.

Accordingly, the problem with the Medipix™ approach is that a relatively large number of photogenerated electrons are required to increment the counter 20.

In the case of medical imaging devices, the Medipix™ sensor 10 is best suited for use in high dosage radiation systems. However, in many cases it is desirable to repeatedly expose a patient to low dosage radiation (e.g., multiple x-rays etc.). But because of the relatively large number (around 10 k) of photogenerated electrons required to increment the counter 20 in the Medipix™ sensor 10, the Medipix™ sensor 10 may have limited utility in these situations.

The above-mentioned parallel output approach requires as many conductors as the number of bits in the counter 20. While this approach produces a faster response, the large number of conductors required therein obscures part of the photosensors. Consequently, the photosensors' sensitivity is degraded with the parallel output approach. In a similar fashion, the bit serial output approach has two serious disadvantages: it is not possible to read out a sub-section array (i.e., no random access); and the readout time of the array is increased as more clock cycles are required to read the data from a photosensor.

SUMMARY OF THE INVENTION

In view of the foregoing background, an object of the invention is to provide a high performance photosensor.

This and other objects, advantages and features in accordance with the invention are provided by a photosensor comprising photovoltage generating means or generator for generating a photovoltage, and a comparator operable to determine the number of integer multiples of a threshold voltage associated with the photosensor, and primary counting means or counter that is incremented by the determined number of integer multiples.

The photosensor may further comprises charge injecting means or injector configured to add one or more units of voltage to the comparator, with each voltage unit having a fixed and predefined value that is less than the threshold voltage. A secondary counter may be operable to determine the number of such voltage units needed to cause the voltage in the comparator to attain an integer multiple of the threshold voltage.

The charge injecting means may comprises a reference voltage, two or more connected capacitors, and switching means or a switch provided with a switching voltage. During a first operational phase, the capacitors may be connected to the reference voltage. During a second operational phase, the capacitors may be connected to the switching means. During a third operational phase, the capacitors may be connected to the comparator of the photosensor to cause their discharge. The photovoltage generating means may comprise a charge amplifier.

A second aspect of the invention is directed to an imaging device comprising a plurality of photosensors as discussed above, wherein the primary and secondary counters of each of the photosensors are read in a parallel manner.

A third aspect of the invention is directed to an imaging device comprising a plurality of photosensors as discussed above, wherein the primary and secondary counters of each of the photosensors are read in bit-serial manner.

A fourth aspect of the invention is directed to an imaging device comprising a plurality of photosensors as discussed above, wherein the primary and secondary counters of each of the photosensors are read in a hybrid parallel and bit-serial manner.

A fifth aspect of the invention is directed to a medical imaging device comprising the imaging of any one of the second, third or fourth aspects.

A sixth aspect of the invention is directed to a camera comprising a photosensor based on the first aspect.

A seventh aspect of the invention is directed to a camera comprising an imaging device based on the second or third aspects.

An eighth aspect of the invention is directed to a method of operating a photosensor comprising comparing a photovoltage generated by photovoltaic detection means or a detector with a threshold voltage to determine a number of integer multiples of the threshold voltage associated with the photosensor; incrementing a primary counter by the determined integer multiple; and adding one or more units of charge to the photovoltage until the resulting voltage reaches an integer multiple of the threshold voltage. The voltage units are fixed, and pre-defined values and are less than the threshold voltage. The number of voltage units needed to cause the resulting voltage to reach an integer multiple of the threshold voltage is counted by a secondary counter.

To distinguish the photosensor of the present invention from the previously mentioned prior art photosensors, the photosensor will now be referred to as the improved photosensor.

The improved photosensor may increase the voltage resolution of a conventional photosensor by repeatedly injecting a small amount of charge onto the photosensor's active sensing area and counting how many of these charge injections are required to cause the photosensor's counter to be incremented. This allows the improved photosensor to improve on the previously described prior art photocounting methods by enabling the measurement of the amount of charge accumulated in the feedback capacitor that is insufficient to increment the conventional photosensor's counter.

From the above, it can be seen that the role of the charge injector in the improved photosensor contrasts with the role of the charge injecting node in the Medipix™ sensor 10, insofar as the charge injecting node in the Medipix™ sensor 10 merely serves the function of testing the sensor 10 as opposed to becoming actively involved in the photogenerated charge measurement process.

DETAILED DESCRIPTION OF THE PREFERRED EMBODIMENTS

As discussed earlier, there are a variety of circuits available for measuring the charge generated in a photosensor. The improved photosensor is described below using exemplary circuits employing charge amplification to improve gain conversion in a larger pixel. It will be appreciated that the improved photosensor could be implemented equally as well with other charge amplifiers and charge-counting circuits. Furthermore, it will be appreciated that the improved photosensor could also employ the photocharge/photovoltage generating circuit previously described for smaller pixels (i.e., without charge amplification).

Figure 5:
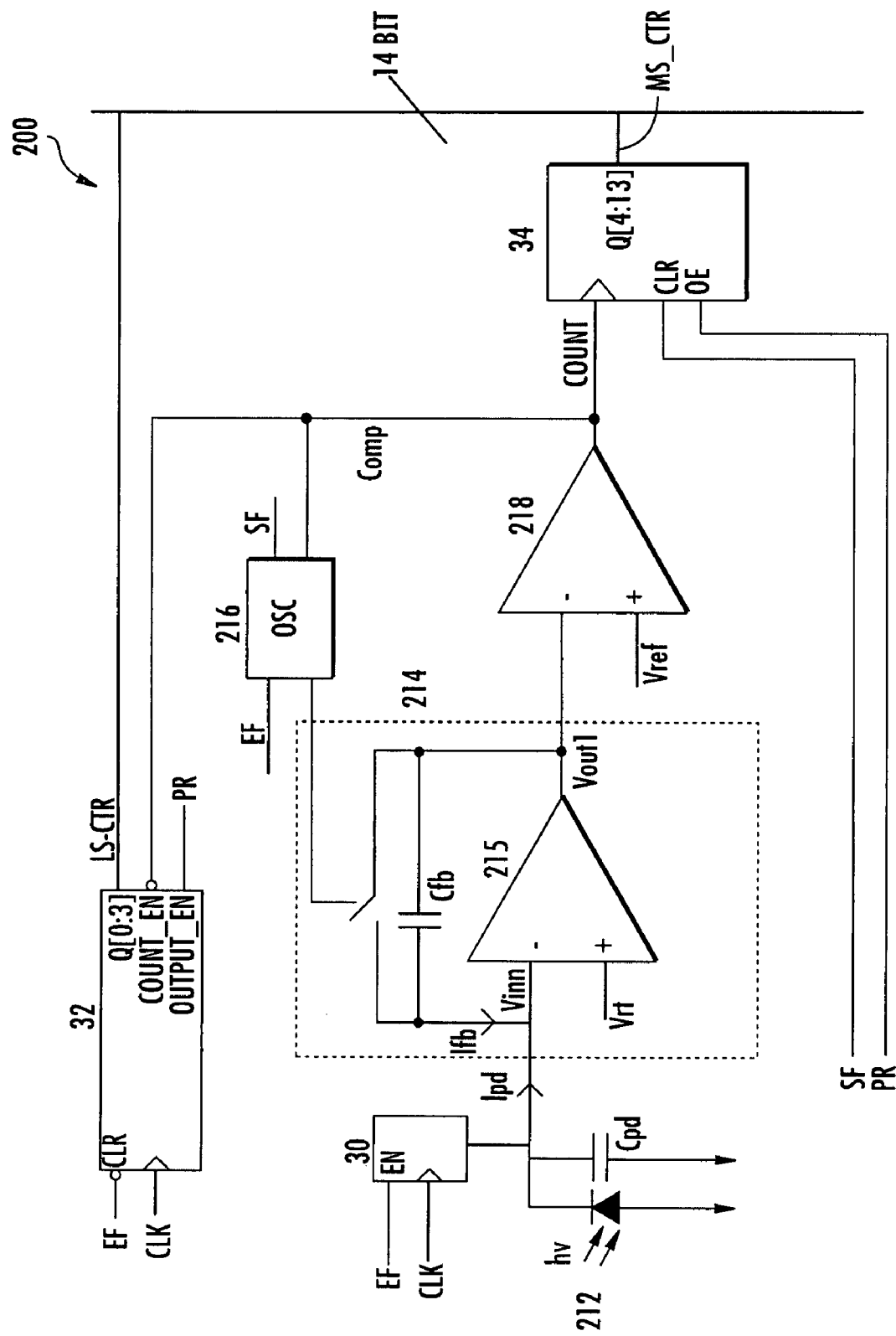
FIG. 5 is a circuit diagram of the improved photosensor in accordance with the first aspect of the invention.

Referring to FIG. 5, the improved photosensor 200 comprises a photodiode 212 connected to a charge injector 30. The charge injector 30 is in turn connected to a secondary counter 32 (which produces an output signal LS_CTR) and a charge integrator circuit 214 comprising a feedback capacitor $C_{fb}$ and a charge amplifier 215. The charge amplifier 215 includes two inputs, namely an inverting input $V_{inn}$ and a reset input $V_0$. The charge integrator circuit 214 is connected to a monostable oscillator 216 and a comparator 218. The comparator 218 is in turn connected to a primary counter 34 that produces an output signal MS_CTR.

On demand, the charge injector 30 generates a specified amount of charge that is significantly less than that needed to increment the primary counter 34 by one count. In particular, the charge injector 30 produces approximately $1/16^{th}$ of the charge required to increment the primary counter 34 by one count.

Figure 6:
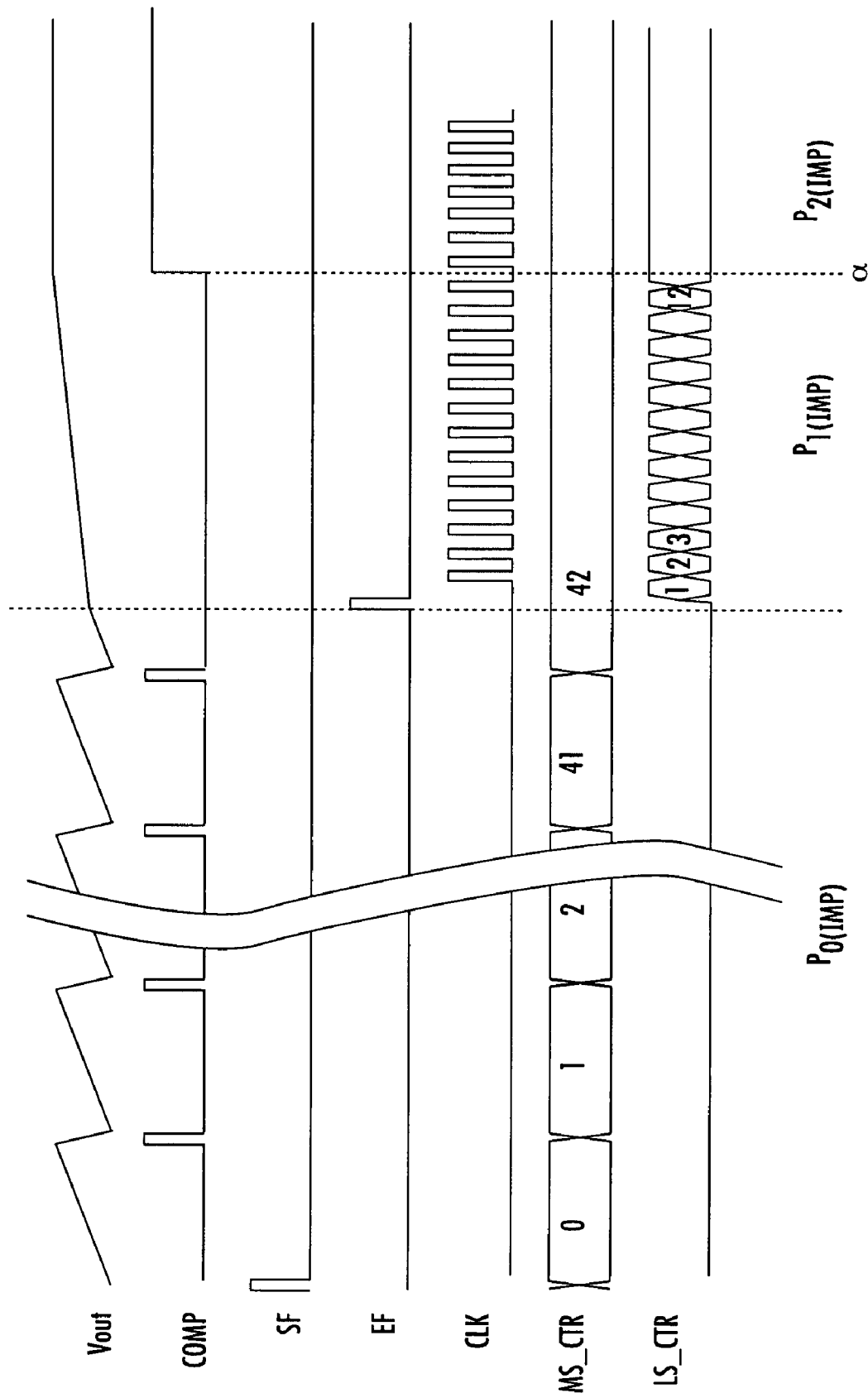
FIG. 6 is a timing diagram for the improved photosensor shown in FIG. 5.

Referring to FIGS. 5 and 6, it can be seen that the improved photosensor 200 has three operational phases: an illumination phase ($P_{0(IMP)}$), a fine conversion phase ($P_{1(IMP)}$) and a read-out phase ($P_{2(IMP)}$)

Figure 1:
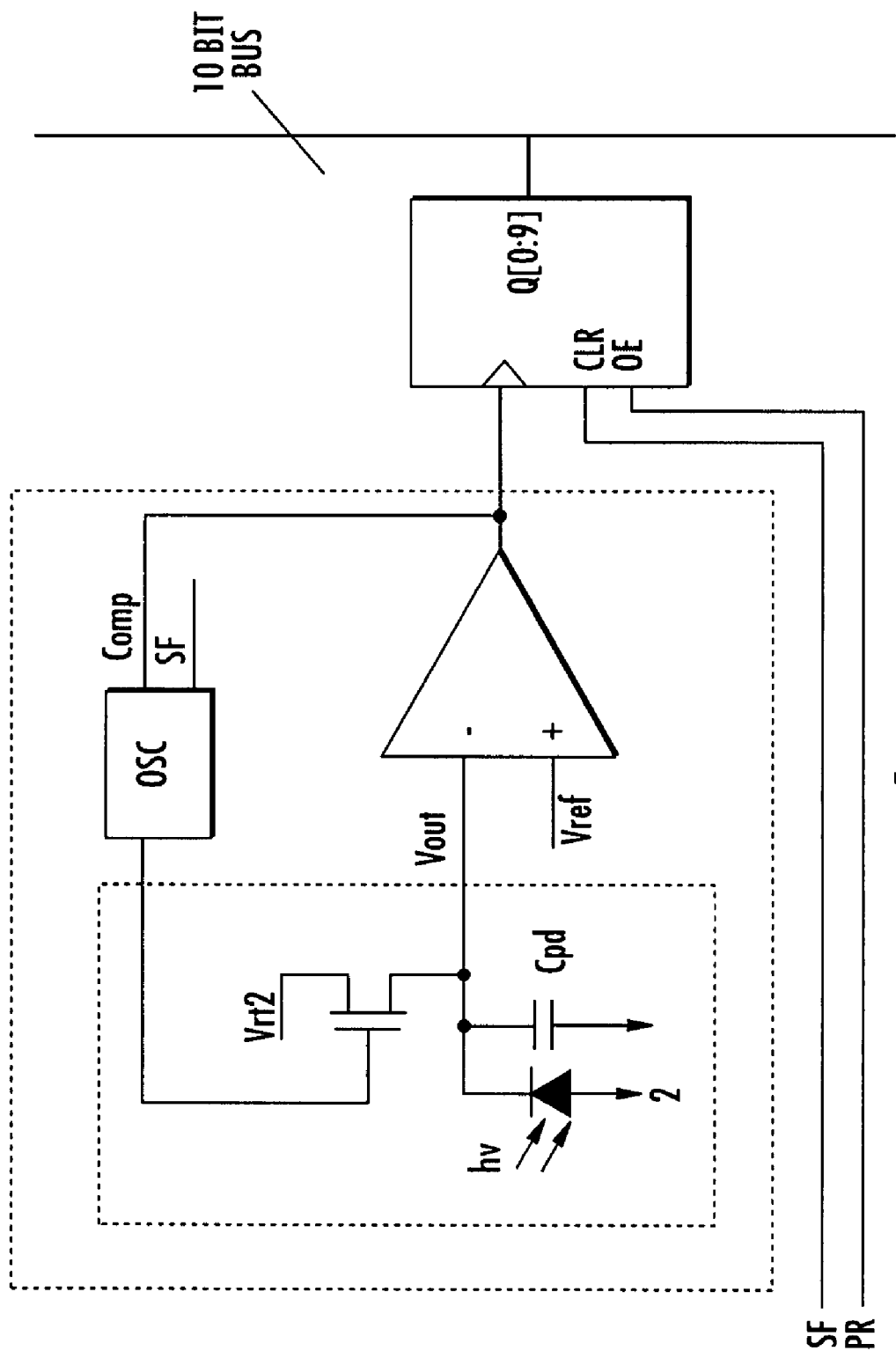
FIG. 1 is a diagram of a circuit for a small pixel according to the prior art.
Figure 2:
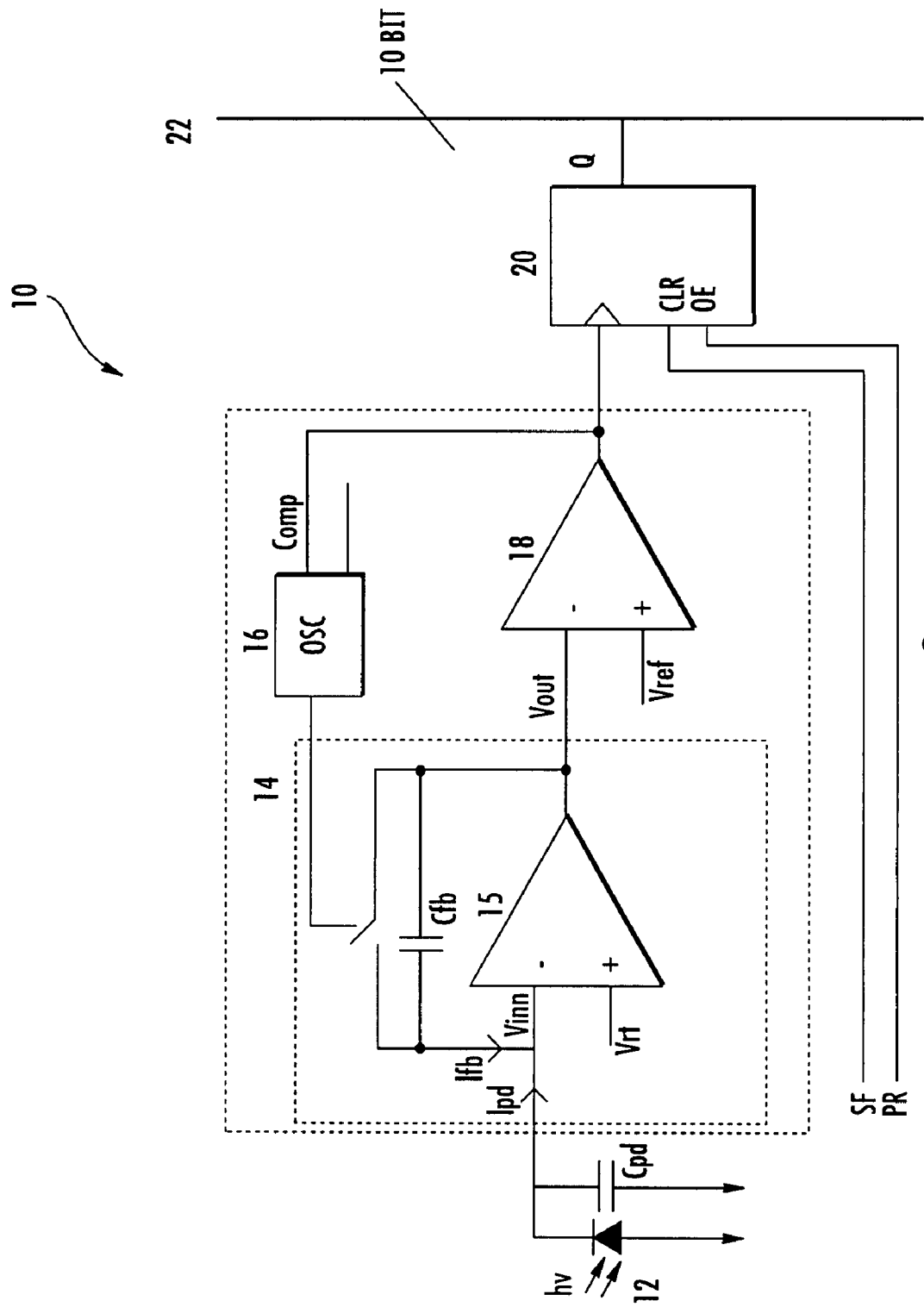
FIG. 2 is a diagram of a circuit for a large pixel for use in a Medipix™ parallel output imaging device according to the prior art.
Figure 3:
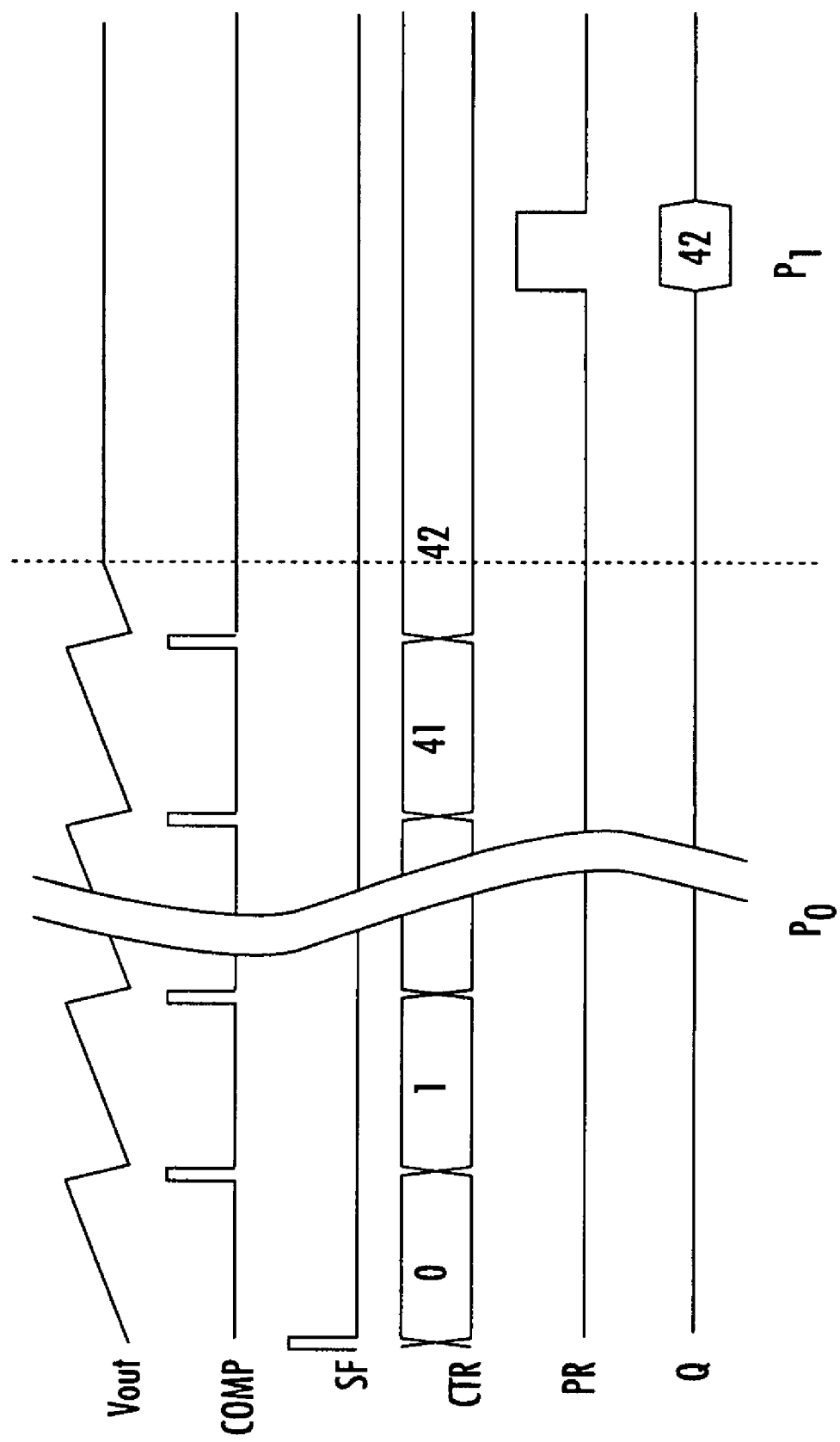
FIG. 3 is a timing diagram for the prior pixel shown in FIG. 2.
Figure 4:
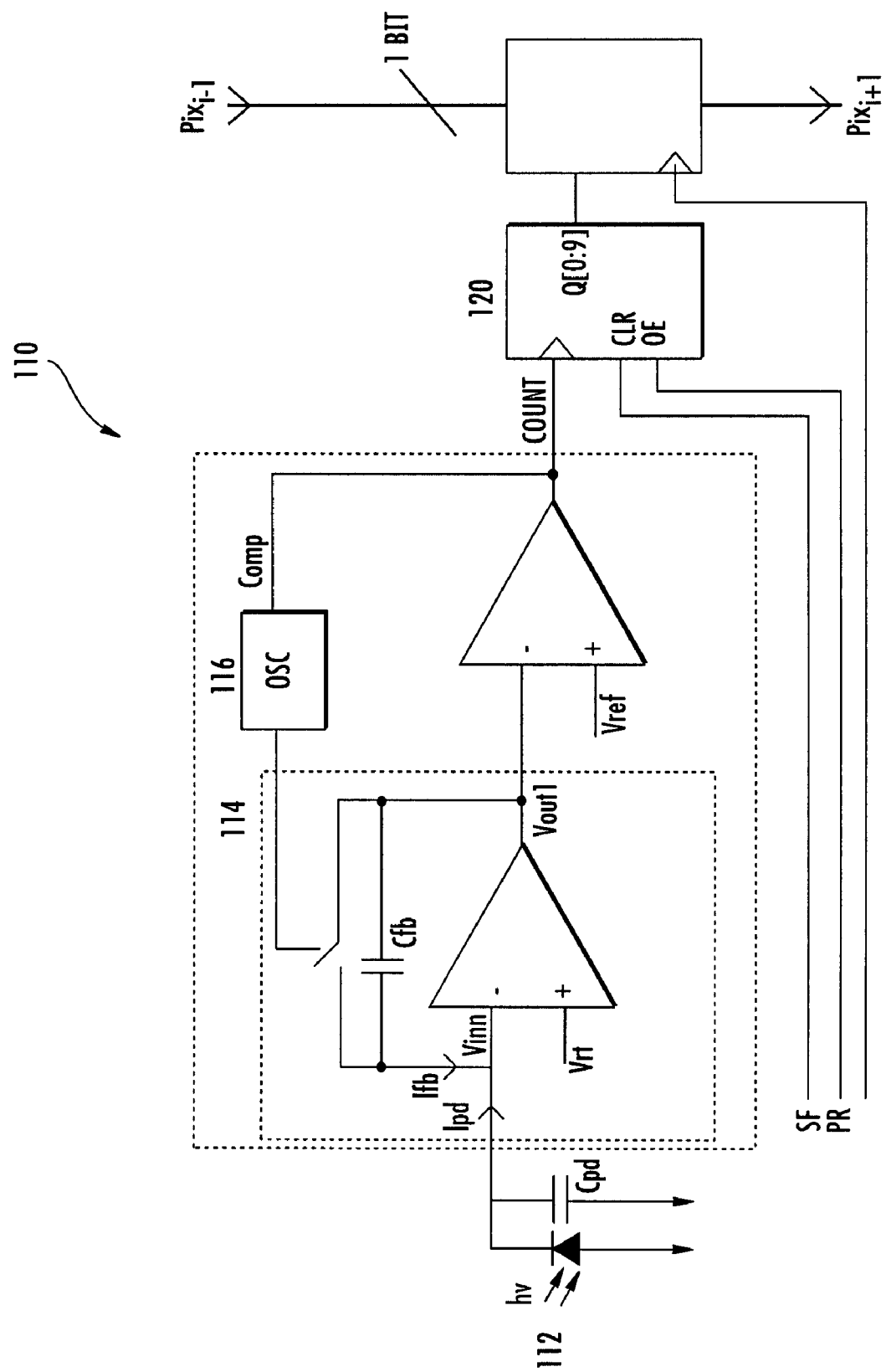
FIG. 4 is a circuit diagram of a serial output imaging device according to the prior art.

The illumination phase ($P_{0(IMP)}$) of the improved photosensor 200 is similar to that of the prior art photosensors (i.e., phase $P_0$ in FIG. 3). At the start of the illumination phase, before radiation has been emitted from a radiation source (not shown), a Start Frame (SF) signal is transmitted which resets the primary counter 34 and the charge integrator circuit 214 (to a reset voltage $V_0$).

When radiation is emitted from the radiation source (not shown) and the improved photosensor 200 is illuminated thereby, the charge integrator 214 detects the photogenerated charge produced in the photodiode 212 and the feedback capacitor $C_{fb}$ produces a ramp signal $V_{out1}$. When the output from the charge integrator 214 reaches a threshold $V_{ref}$ (set externally to the improved photosensor 200), an output (COMP) from the comparator 218 is switched high. The primary counter 34 counts the pulses in the comparator's output signal (COMP) by incrementing the output signal MS_CTR.

The illumination phase ($P_{0(IMP)}$) is ended by the cessation of the illumination source; the obscuration of the illumination source (e.g., by a shutter); or the cessation of charge collection (e.g., by disconnecting the photodiode 212 from the charge amplifier 215).

After the end of the illumination phase ($P_{0(IMP)}$), the fine conversion phase ($P_{1(IMP)}$) is commenced.

During the fine conversion phase ($P_{1(IMP)}$), the output voltage ($V_{out1}$) from the charge integrator 214 is most likely to have a value part-way between the reset voltage $V_0$ and the threshold voltage $V_{ref}$. This part-way state will be known as a partial threshold state. While the previously described prior art photosensors ignore partial threshold voltages, the improved photosensor 200 measures such voltages.

More particularly, the start of the fine-conversion phase ($P_{1(IMP)}$) is indicated by the assertion of an End Frame (EF) signal. The End Frame (EF) signal has two function: inhibiting further resets of the charge integrator 214; and resetting the secondary counter 32.

A fine conversion clock signal (CLK) is then emitted in a pulsed fashion, wherein each pulse causes the charge injector 30 to inject a succession of small charges into the charge integrator circuit 214. Accordingly, each injection from the charge injector 30 causes the output voltage ($V_{out1}$) from the charge integrator 214 to increase.

Each injection from the charge injector 30 is accompanied by an increment to the output (LS_CTR) of the secondary counter 32. After a number of charge injections from the charge injector 30, the output voltage ($V_{out1}$) of the charge integrator 214 reaches the comparator's threshold voltage ($V_{ref}$) (at time α in FIG. 6) and the COMP signal is set high.

It will be appreciated that the discussion to date has focused on a photosensor comprising a single photodiode. However, since the improved photosensor 200 is most likely to be used in an array structure with a plurality of other improved photosensors 200. The clocking system (CLK) needs to supply enough pulses to ensure that the output voltage ($V_{out1}$) of every improved photosensor 200 has reached the threshold voltage ($V_{ref}$). Consequently, even when a COMP signal is set high for a single improved photosensor 200, the clock pulses (CLK) continue to be emitted (to cater for the remaining improved photosensors 200).

However, once a COMP signal has been emitted for a given improved photosensor 200, the secondary counter 32 for the photosensor 200 is disabled (i.e., so that it is not further incremented by the continuing train of clock pulses [CLK]). In addition, the reset signal for the charge-integrator 214 of the improved photosensor 200 is disabled, so that the COMP signal remains asserted.

There are a number of alternative methods of achieving this effect, such as digital circuitry techniques, for example an RSlatch on the Count_En input to the secondary counter 32. It is advantageous, but not strictly necessary to inhibit the charge injector 214 after the voltage threshold ($V_{ref}$) has been reached.

The output signal from the improved photosensor 200 is read out in a similar manner to that of the previously described prior art photosensors (e.g., parallel, serial or combination). In particular, the output signal (MS_CTR) from the primary counter 34 is related to the charge generated in the photodiode 212 in the same manner as the prior art photosensors.

More specifically, if the primary counter 34 has an output value (MS_CTR) of N, then the amount of charge ($Q_{pd}$) generated by the photodiode 212 is given by:

$$Q_{pd} = N*(V_{ref}-V_0)*C_{fb} \quad (4)$$

Alternatively, the number of photoelectrons (Ne_Mscount) generated in the photodiode 212 and detected by the primary counter 34 is approximately given by:

$$\text{Ne\_MScount} = N*(V_{ref}-V_{rt})*\frac{C_{fb}}{e} \quad (5)$$

On a related note, if the secondary counter 32 has an output value of M, then the amount of charge ($Q_{inject}$) injected by the charge injector 30 into the charge integrator circuit 214 is given by:

$$Q_{inject} = M \times Q_i \quad (6)$$

where $Q_i$ is the amount of charge injected onto input $V_{inn}$ on each pulse of the clocking signal (CLK).

As $Q_{inject}$ is the amount of charge required to cause the charge integrator's 214 output ($V_{out1}$) to reach the threshold voltage ($V_{ref}$), the charge stored ($Q_{fb}$) on the feedback capacitor $C_{fb}$ at the end of the illumination phase ($P_0$) is given by:

$$Q_{fb} = (V_{ref}-V_0)*C_{fb} - M*Q_i \quad (7)$$

Alternatively, the number of electrons (Ne_Lscount) generated in the photodiode 212 and detected by the secondary counter 32 (i.e., that are a fraction of the number required to increment the primary counter 34) is given by:

$$\text{Ne\_LScount} = \frac{((V_{ref}-V_0)*C_{fb} - M*Q_i)}{e} \quad (8)$$

Hence, the total number of electrons (Ne_total) generated in the photodiode 212 during the illumination phase ($P_{0(IMP)}$) can be determined by combining the number of electrons determined by the primary and secondary counters 34, 32 as follows:

$$Ne\_total = Ne\_MScount + Ne\_Lscount \quad (9)$$

Using the above formulation, Ne_total can be alternatively expressed as:

$$Ne\_total = \frac{N*(V_{ref}-V_0)*C_{fb} + ((V_{ref}-V_0)*C_{fb} - M*Q_i)}{e} \quad (10)$$

There are a number of methods of charge injection that a person skilled in the art could employ in the improved photosensor. A few of these methods are described below.

Figure 7:
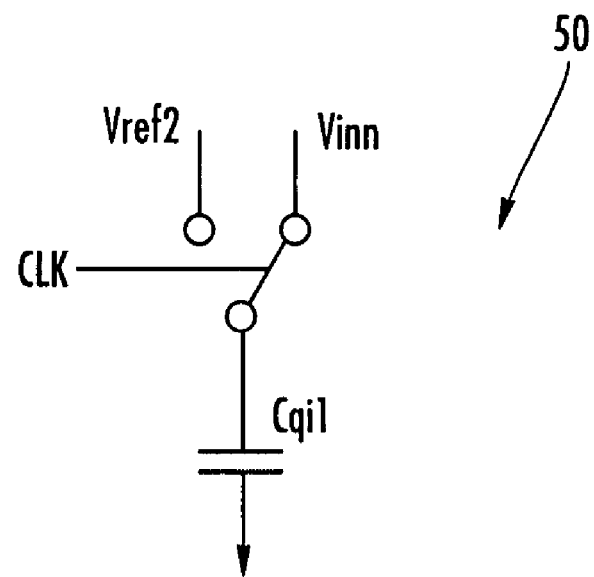
FIG. 7 is a circuit diagram of a charge injection circuit for the improved photosensor shown in FIG. 5.

FIG. 7 shows a first example of a charge injector. 50 comprising a capacitor $C_{qi1}$ and a low-impedance voltage reference $V_{ref2}$, wherein $V_{inn}$ is the inverting input of the operational amplifier in the charge integrating circuit of the improved photosensor. When the capacitor $C_{qi1}$ is connected to $V_{ref2}$, the charge ($Q_{cap}$) stored on the capacitor $C_{qi1}$ is given by $Q_{cap}=V_{ref2} \times C_{qi1}$. When the capacitor $C_{qi1}$ is connected to $V_{inn}$, the capacitor $C_{qi1}$ is discharged to $V_{inn}$. Consequently, the charge $Q_i$ injected into the charge integrator circuit (not shown) is given by:

$$Q_i = (V_{ref2} - V_{inn}) \times C_{qi1} \quad (11)$$

In this case, the voltage reference for the charge injection ($V_{ref2}$) may be (but is not necessarily) the same as comparator reference ($V_{ref}$).

For higher resolution, a small amount of charge will be required. Consequently, either ($V_{ref2}-V_{inn}$) needs to be small and/or $C_{qi1}$ needs to be small. However, it is technically difficult to fabricate capacitors with a great degree of reliability and accuracy. Accordingly, to ensure that a small charge is injected into the charge integrator during the fine conversion phase $P_{1(IMP)}$ it is more convenient to set the $V_{ref2}$ voltage as close to $V_{inn}$ as possible.

Figure 8:
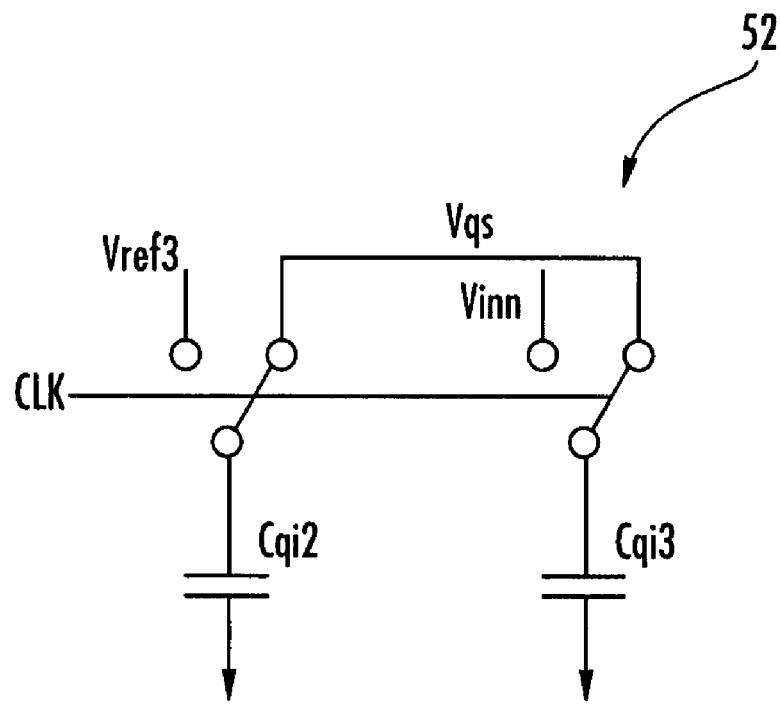
FIG. 8 is a circuit diagram of another charge injection circuit for the improved photosensor shown in FIG. 5.

FIG. 8 depicts a second charge injector circuit 52 that enables a smaller amount of charge to be injected for the same values of capacitance and reference voltage as employed in the first charge injector circuit (FIG. 7). In particular, the second charge injection system 52 comprises two capacitors ($C_{qi2}$ and $C_{qi3}$), a reference voltage ($V_{ref3}$) and a switching voltage ($V_{qs}$).

During a first operational phase ($P_A$) of the second charge injector circuit 52, the capacitors ($C_{qi2}$ and $C_{qi3}$) are respectively connected to the reference voltage ($V_{ref3}$) and the inverting input ($V_{inn}$) of the operational amplifier (not shown) (in the charge integrating circuit (not shown) of the improved photosensor). Accordingly, the charges ($Q_2$ and $Q_3$) respectively accumulated by the capacitors $C_{qi2}$ and $C_{qi3}$ are given by:

$$Q_2 = V_{ref3} \times C_{qi2} \quad (12)$$

$$Q_3 = V_{inn} \times C_{qi3} \quad (13)$$

During a second operational phase ($P_B$) of the second charge injector circuit 52, the capacitors $C_{qi2}$ and $C_{qi3}$ are isolated from voltage sources and are connected together through the switch $V_{qs}$. In this case, the charge on each capacitor $C_{qi2}$ and $C_{qi3}$ is respectively given by:

$$Q_2 = V_{qs} \times C_{qi2} \quad (14)$$

$$Q_3 = V_{qs} \times C_{qi3} \quad (15)$$

Accordingly, since the capacitors $C_{qi2}$ and $C_{qi3}$ are not connected to any voltage source or sink there is nowhere for the charge accumulated in the capacitors to go (i.e., conservation of charge). Consequently, the total charge generated during the second operational phase ($P_B$) of the second charge injector circuit 52 is the same as that generated during the first operational phase ($P_A$) of the circuit.

In other words, the charge generated during the first operational phase ($P_A$) of the second charge injector circuit 52 is given by:

$$Q_2+Q_3 = V_{qs} \times C_{qi2} + V_{qs} \times C_{qi3} = V_{ref3} \times C_{qi2} + V_{inn} \times C_{qi3} \quad (16)$$

Assuming that $C_{qi2}$ is the same value as $C_{qi3}$, then the above equation can be simplified to:

$$2 \times V_{qs} = V_{ref3} + V_{inn} \quad (17)$$

Thus, $V_{qs} = \frac{1}{2}(V_{ref3} + V_{inn})$.

At the next illumination operational phase ($P_{0(IMP)}$) of the improved photosensor, capacitor $C_{qi3}$ is connected to node $V_{inn}$. Consequently, the capacitor will be discharged to the voltage level of $V_{inn}$ and the amount of charge injected into node $V_{inn}$ is given by:

$$Q_i = C_{qi3} \times (\frac{1}{2}[V_{ref3}+V_{inn}] - V_{inn}) \quad (18)$$

Or in other words, $$Q_i = C_{qi3} \times \frac{1}{2}(V_{ref3} - V_{inn}) \quad (19)$$

Comparing Equation 10 and Equation 18, it can be seen that for the same reference voltages and capacitor values, half the amount of charge is injected by the second charge injector circuit 52. The mechanism employed by the second charge injector circuit 52 can be extended (a third injection 54 is shown in FIG. 9), to successively decrease the amount of charge injected into the $V_{inn}$ node without requiring the use of small and inaccurate capacitors.

Figure 9:
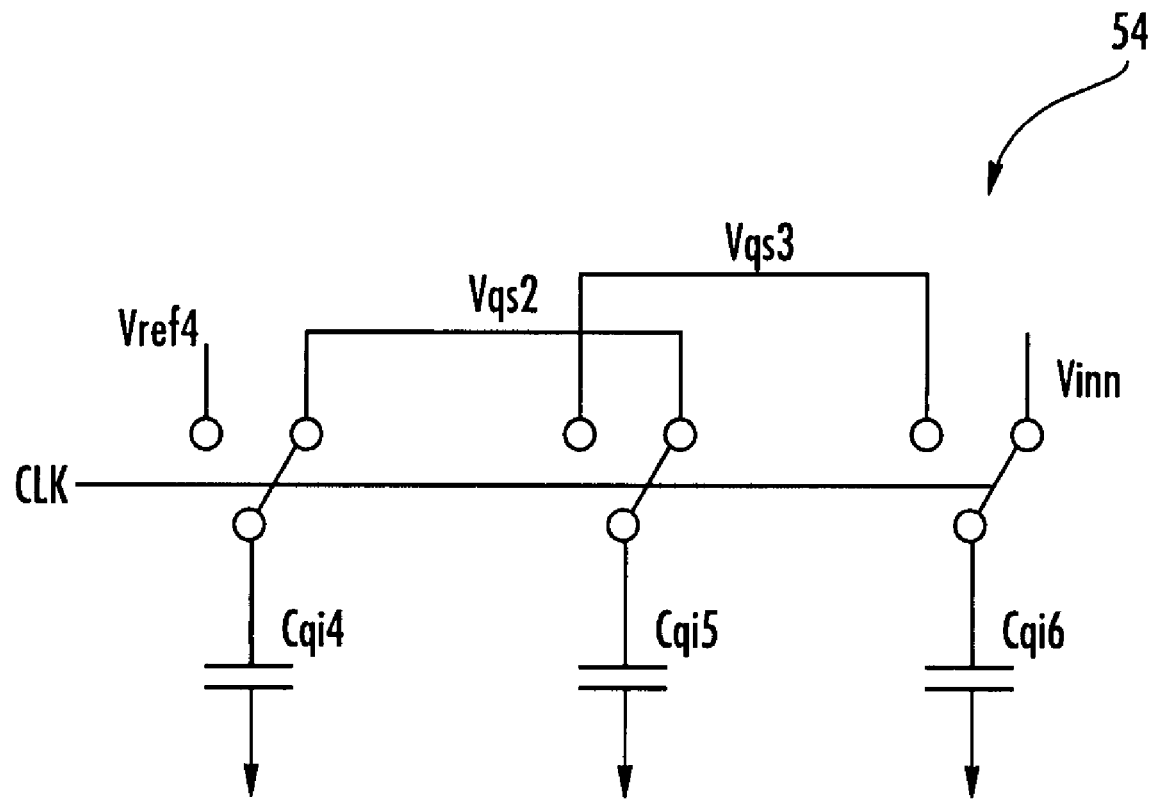
FIG. 9 is a circuit diagram of a yet another charge injection circuit for the improved photosensor shown in FIG. 5.

In particular, referring to FIG. 9, the third charge injector 54 comprises three capacitors $C_{qi4}$, $C_{qi5}$ and $C_{qi6}$ connected by two switching voltages $V_{qs2}$ and $V_{qs3}$. As before, each iteration of the charge injector 54 comprises two operational phases, namely $P_A$ and $P_B$.

During a first iteration, for the first operational phase $P_A(1)$ of the third charge injector circuit 54, the charge $Q_4$, $Q_5$ and $Q_6$ respectively accumulated on the three capacitors $C_{qi4}$, $C_{qi5}$ and $C_{qi6}$ is given by:

$$Q_6 = V_{inn} \times C_{qi6} \quad (20)$$

$$Q_5 = V_{qs2a1} \times C_{qi5} \quad (21)$$

$$Q_4 = V_{qs2a1} \times C_{qi4} \quad (22)$$

During the second operational phase $P_B(1)$, the charge $Q_4$, $Q_5$ and $Q_6$ respectively accumulated on the three capacitors $C_{qi4}$, $C_{qi5}$ and $C_{qi6}$ is given by:

$$Q_6 = V_{qs3b1} \times C_{qi6} \quad (23)$$

$$Q_5 = V_{qs3b1} \times C_{qi5} \quad (24)$$

$$Q_4 = V_{ref4} \times C_{qi4} \quad (25)$$

During the first operational phase $P_A(2)$ of a second iteration of the charge injector 54, the charge $Q_4$, $Q_5$ and $Q_6$ respectively accumulated on the three capacitors $C_{qi4}$, $C_{qi5}$ and $C_{qi6}$ is given by:

$$Q_6 = V_{inn} \times C_{qi6} \quad (26)$$

$$Q_5 = V_{qs2a2} \times C_{qi5} \quad (27)$$

$$Q_4 = V_{qs2a2} \times C_{qi4} \quad (28)$$

$$Q_4+Q_5 = V_{qs2a2} \times 2 \times C_q = V_{ref3} \times C_q + V_{qs3b1} \times C_q \quad (29)$$

$$\Rightarrow V_{qsa2} = \frac{1}{2}(V_{ref3} + V_{qs3b1}) \quad (30)$$

During the second operational phase $P_B(2)$, the charge $Q_4$, $Q_5$ and $Q_6$ respectively accumulated on the three capacitors $C_{qi4}$, $C_{qi5}$ and $C_{qi6}$ is given by:

$$Q_6 = V_{qs3b2} \times C_{qi6} \quad (31)$$

$$Q_5 = V_{qs3b2} \times C_{qi5} \quad (32)$$

$$Q_4 = V_{ref3} \times C_{qi4} \quad (33)$$

$$Q_5 + Q_6 = 2 \times V_{qs3b2} \times C_q = V_{inn} \times C_{qi6} + V_{qs2a2} \times C_{qi5} \quad (34)$$

$$\Rightarrow V_{qs3b2} = \tfrac{1}{2}(V_{inn} + V_{qs2a2}) \quad (35)$$

$$\Rightarrow V_{qs3b2} = \tfrac{1}{2}(V_{inn} + \tfrac{1}{2}[V_{ref3} + V_{qs3b1}]) \quad (36)$$

Alterations and modifications may be made to the above without departing from the scope of the present invention.

That which is claimed:

1. A photosensor comprising:
   a photovoltage generator for generating a photovoltage;
   a comparator for determining a number of integer multiples of a threshold voltage associated with the photosensor;
   a primary counter being incremented by the determined number of integer multiples;
   a voltage injector for adding at least one unit of voltage to said comparator, with each voltage unit having a value less than the threshold voltage; and
   a secondary counter for determining a number of voltage units needed to cause the voltage in said comparator to attain an integer multiple of the threshold voltage.

2. A photosensor as in claim 1 wherein said voltage injector comprises:
   a plurality of capacitors; and
   a switch for connecting said plurality of capacitors to a reference voltage during a first operational phase, to a switching voltage during a second operational phase, and to said comparator to cause their discharge during a third operational phase.

3. A photosensor as in claim 1 wherein said photovoltage generator comprises a charge amplifier.

4. An imaging device comprising:
   a plurality of photosensors, each photosensor comprising
      a photovoltage generator for generating a photovoltage associated with the plurality of photosensors,
      a comparator for determining a number of integer multiples of a threshold voltage,
      a primary counter being incremented by the determined number of integer multiples,
      a voltage injector for adding at least one unit of voltage to said comparator, with each voltage unit having a value less than the threshold voltage, and
      a secondary counter for determining a number of voltage units needed to cause the voltage in said comparator to attain an integer multiple of the threshold voltage.

5. An imaging device as in claim 4 wherein said voltage injector comprises:
   a plurality of capacitors; and
   a switch for connecting said plurality of capacitors to a reference voltage during a first operational phase, to a switching voltage during a second operational phase, and to said comparator to cause their discharge during a third operational phase.

6. An imaging device as in claim 4 wherein said photovoltage generator comprises a charge amplifier.

7. An imaging device as in claim 4 wherein said primary and secondary counters of each photosensor are read in parallel.

8. An imaging device as in claim 4 wherein said primary and secondary counters of each photosensor are read serially.

9. An imaging device as in claim 4 wherein said primary and secondary counters of each photosensor is read in a hybrid parallel and serial manner.

10. An imaging device as in claim 4 wherein said plurality of photosensors are configured so that the imaging device is a camera.

11. A method for operating a photosensor comprising:
   generating a photovoltage using a photovoltage generator;
   comparing the generated photovoltage to a threshold voltage in a comparator to determine a number of integer multiples of the threshold voltage associated with the photosensor;
   incrementing a primary counter by the determined number of integer multiples;
   adding at least one unit of voltage via a voltage injector to the comparator until a resulting voltage reaches an integer multiple of the threshold voltage, each unit of voltage being less than the threshold voltage; and
   determining the number of voltage units needed using a secondary counter to cause the voltage in the comparator to reach an integer multiple of the threshold voltage.

12. A method as in claim 11 wherein the voltage injector comprises a plurality of capacitors; and a switch for connecting the plurality of capacitors to a reference voltage during a first operational phase, to a switching voltage during a second operational phase, and to said comparator to cause their discharge during a third operational phase.

13. A method as in claim 11 wherein the photovoltage generator comprises a charge amplifier.

* * * * *

UNITED STATES PATENT AND TRADEMARK OFFICE
CERTIFICATE OF CORRECTION

PATENT NO. : 7,586,168 B2
APPLICATION NO. : 11/750024
DATED : September 8, 2009
INVENTOR(S) : Jeffrey Raynor It is certified that error appears in the above-identified patent and that said Letters Patent is hereby corrected as shown below:

| | |
|---|---|
| Column 2, Line 18 | Delete: "kgs"<br>Insert --$kgs^{-2}$-- |
| Column 2, Line 19 | Delete: "$_2K$"<br>Insert --K-- |
| Column 5, Line 7 | Delete: "comprises"<br>Insert --comprise-- |
| Column 5, Line 15 | Delete: "comprises"<br>Insert --comprise-- |
| Column 5, Line 55 | Delete: "and pre-defined"<br>Insert --pre-defined-- |
| Column 6, Line 34 | Delete: "a yet"<br>Insert --yet-- |
| Column 7, Line 4 | Delete: ")"<br>Insert --).-- |

Signed and Sealed this

Twentieth Day of July, 2010

David J. Kappos
*Director of the United States Patent and Trademark Office*